United States Patent
Thomas et al.

(10) Patent No.: US 6,647,078 B1
(45) Date of Patent: Nov. 11, 2003

(54) METHOD AND DEVICE FOR MULTI-USER FREQUENCY-DOMAIN CHANNEL ESTIMATION BASED ON GRADIENT OPTIMIZATION TECHNIQUES

(75) Inventors: Timothy A. Thomas, Palatine, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 608 days.

(21) Appl. No.: 09/608,582

(22) Filed: Jun. 30, 2000

(51) Int. Cl.$^7$ ................................................. H04B 1/10
(52) U.S. Cl. ..................... 375/349; 375/346; 375/285; 455/63; 455/278.1
(58) Field of Search ..................... 375/316, 230–234, 375/235, 262, 265, 267, 341, 347, 346, 144, 148, 349, 285; 455/63, 65, 137, 273, 276.1, 278.1; 342/380; 370/204, 206, 208, 210

(56) References Cited

U.S. PATENT DOCUMENTS

| | | | |
|---|---|---|---|
| 5,905,721 A | * 5/1999 | Liu et al. ..................... | 370/342 |
| 5,912,876 A | * 6/1999 | H'mimy ..................... | 370/210 |
| 6,101,399 A | * 8/2000 | Raleigh et al. ............. | 455/561 |
| 6,141,393 A | * 10/2000 | Thomas et al. ............. | 375/347 |
| 6,298,035 B1 | * 10/2001 | Heiskala ..................... | 370/206 |
| 6,442,129 B1 | * 8/2002 | Yonge et al. ............... | 370/204 |
| 6,473,393 B1 | * 10/2002 | Ariyavisitakul et al. .... | 370/203 |

OTHER PUBLICATIONS

Article entitled "*Adaptive Frequency–Domain Equalization and Diversity Combining For Broadband Wireless Communications*," (Author, Martin V. Clark, IEEE JSAC, vol. 16, pp. 1385–1395, Oct. 1998).

Article entitled "*Basis Expansions Models and Diversity Techniques for Blind Identification and Equalization of Time–Varying Channels*," (Author Georgios B. Giannakis, Proc. IEEE, vol. 86, No. 10, pp. 1969–1986, Oct. 1998).

Article entitled "*Characterization of Fast Fading Vector Channels for Multi–Antenna Communication Systems*," (Authors Gregory Raleigh, Suhas N. Diggavi, Ayman F. Naguib, Arogyaswami Paulraj, Proc. 28th, Asilomar Conf., Pacific Grove Ca, 5 pp., Nov. 1994).

Article entitled "*Deterministic Approaches for Blind Equalization of Time–Varying Channels with Antenna Arrays*," (Authors Hui Liu, Georgios B. Giannakis, IEEE Trans on Sig. Proc., vol. 46, No. 11, pp. 3003–3013, Nov. 1998).

Article entitled "*Least–Squares Multi–User Frequency–Domain Channel Estimation for Broadband Wireless Communication Systems*," (Authors Timothy A. Thomas, Fred W. Vook and Kevin L. Baum, 37th Allerton Conference, Monticello, IL, 10 pp., Sep. 1999).

Article entitled *"Linear and Nonlinear Programming,"* (Author David G. Luenberger, Addison–Wesley Publishing Company, Monlo Park, CA, pp. 215–216, 1989).

Article entitled "*Multicarrier Modulation for Data Transmission: An Idea Whose Time Has Come*," (Author John A. C. Bingham, IEEE Comm. Mag., vol. 28, pp. 5–14, May 1990).

(List continued on next page.)

Primary Examiner—Phoung Phu
(74) Attorney, Agent, or Firm—Kenneth A. Haas

(57) ABSTRACT

The invention is a method of estimating the time and frequency response of at least one desired signal received by at least one antenna, based on Gradient Optimization techniques. Through the use of gradient optimization techniques and efficient DFT processing, the invention provides frequency response estimates that require fewer computations than prior art decision-directed channel estimation devices.

21 Claims, 7 Drawing Sheets

OTHER PUBLICATIONS

Article entitled "Robust Channel Estimation for OFDM Systems with Rapid Dispersive Fading Channels," (Authors Ye G. Li, Leonard J. Cimini, Jr., Nelson R. Sollenberger, *IEEE Trans. On Comm.,* vol. 46, pp. 902–915, Jul. 1998).

Article entitled "Sinusoidal Model and Prediction of Fast Fading Processes," (Authors Jeng–Kuang Hwang, Jack H. Winters, Globecom, pp. 892–897, 1998).

Article entitled "Space–Time Modems for Wireless Personal Communications," (Author A. J. Paulraj, Boon C. Ng, *IEEE Personal Communications Magazine,* pp. 36–48, Feb. 1998).

Article entitled "Analysis of DFT–Based Channel Estimators for OFDM*" (Authors Ove Edfors, Magnus Sandell, Jan–Jaap van de Beek, Sara Kate Wilson, Per Ola Börjesson, This work has been presented in part at the 1995 Vehicular Technology Conference (VTC '96) in Chicago, Illinois, Jul. 25–28, 1995, pp. 815–819).

Article entitled "Channel Estimation for OFDM Systems with Transmitter Diversity in Mobile Wireless Channels" (Authors Ye(Geoffrey) Li, *Senior Member, IEEE,* Nambirajan Seshadri, *Senior Member, IEEE,* and Sirikiat Ariyavisitakul, *Senior Member, IEEE,* pp. 461–471, *IEEE Journal of Selected Areas in Communications,* vol. 17, No. 3, Mar. 1999).

* cited by examiner

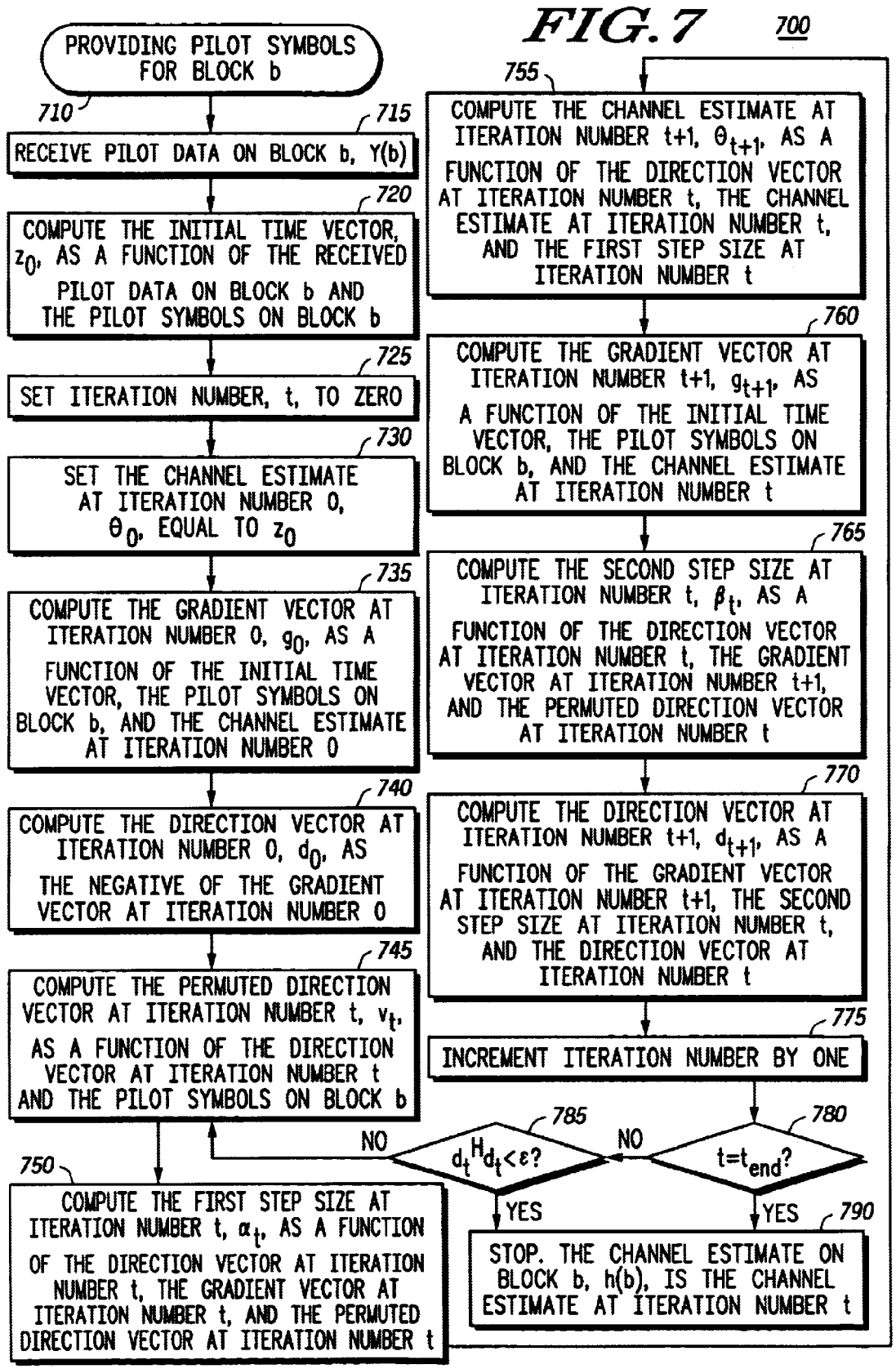

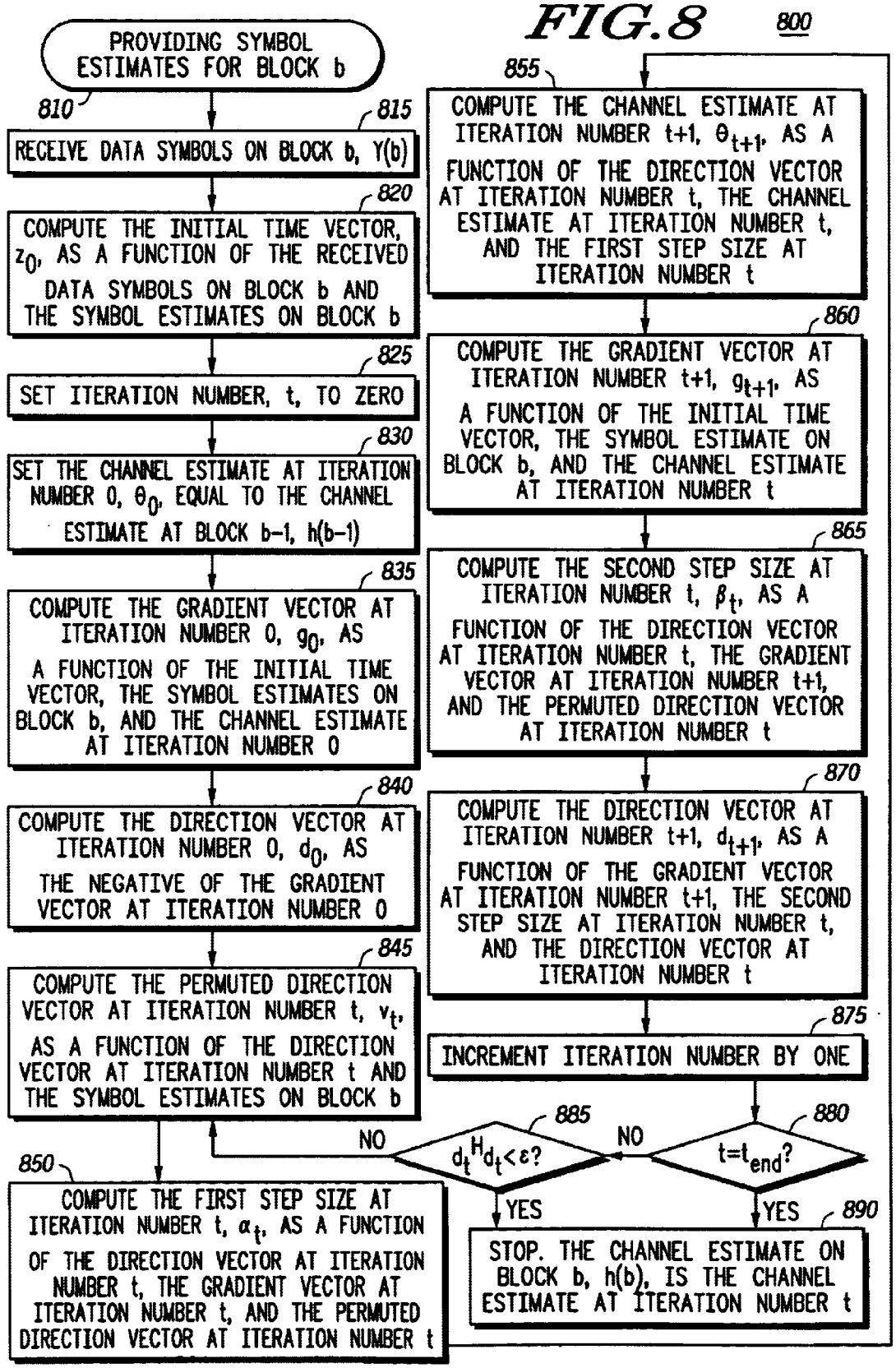

METHOD AND DEVICE FOR MULTI-USER FREQUENCY-DOMAIN CHANNEL ESTIMATION BASED ON GRADIENT OPTIMIZATION TECHNIQUES

FIELD OF THE INVENTION

The present invention generally relates to the field of communication systems and more particularly, to estimating the time and frequency response of at least one desired signal received by at least one antenna, based on Gradient Optimization techniques.

BACKGROUND OF THE INVENTION

In a wireless communication system, a major design challenge is to maximize system capacity and performance in the presence of interference, and a time-varying multipath channel. Multipath propagation is caused by the transmitted signal reflecting off objects near the transmitter and receiver and arriving at the receiver over multiple paths. Interference in a communication system can come from a variety of sources depending on the particular system deployment. If the system is in motion, then Doppler-induced channel variations become an issue. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_p$ of propagation paths, where each path has an associated time delay and complex gain. In such a channel, the communication receiver receives the superposition of $L_p$ delayed, attenuated, and phase-shifted copies of the transmitted signal. The number of paths $L_p$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path, as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. This signal duplication causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In a mobile wireless communication system, the complex attenuation of each of the multipath components of the received signal becomes a time-varying function of the transmitter's path and speed throughout the scattering field local to the transmitter's position. The transmitter's motion causes the received signal strength at a particular portion of the occupied bandwidth to vary as time progresses. In a mobile multipath channel, the overall channel response not only varies across the occupied bandwidth of the signal, but also across time as well.

In addition to multipath, interference is another system component that limits the performance of a communication system. If the system is deployed in an unlicensed band, then other users of the band can generate interference. And in a cellular system employing frequency reuse, transmitters in another cell that is allocated the same set of frequency channels can generate co-channel interference. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor tends to increase the level of co-channel interference experienced by a receiver. To better utilize the available spectrum, it would be advantageous to be able to suppress the effects of co-channel interference.

To compensate for co-channel interference, multi-user channel estimation is used. The current multi-user channel estimators require a very large matrix inversion which is based on each user's pilot sequence or symbol decisions to be solved to find a matrix of filtering coefficients that, when multiplied by the received data, gives the channel estimates. This requires processing and storing a large matrix that can be burdensome to processor and memory limited implementations. Also, there is a need to perform a large matrix inversion based on each user's pilot sequences or symbol decisions. The inverse is not a problem when the sequences are known since this inverse is computed once upon device initialization and then stored. However, the large inverse makes decision-directed channel updates impractical in real time.

Thus, there is a need for a method and device for estimating the time and frequency response of at least one transmitted signal received on at least one receive antenna. In addition, there is a need for a method and device to eliminate the need for computing and storing the inverse of a very large matrix.

BRIEF DESCRIPTION OF THE DRAWINGS

FIG. 7 is a flow chart representation of one embodiment of the method performed by the Channel Estimation Device (208) to provide channel estimation for pilot blocks between a transmitting device and a receiving antenna in accordance with the present invention; and FIG. 8 is a flow chart representation of one embodiment of the method performed by the Channel Estimation Device (208) to provide channel estimation for data blocks between a transmitting device and a receiving antenna in accordance with the present invention.

DETAILED DESCRIPTION OF THE PRESENTLY PREFERRED EMBODIMENT

Figure 1:
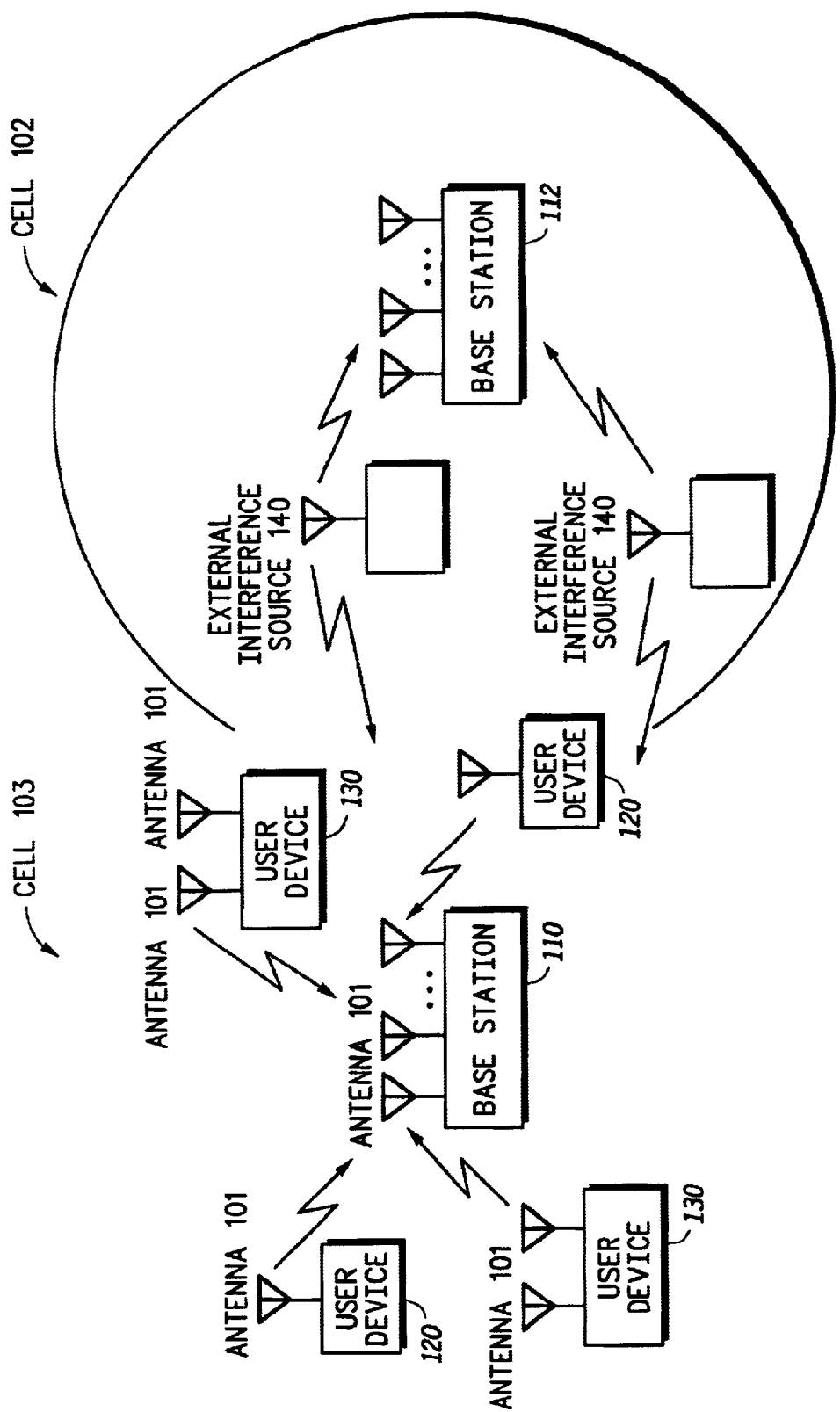
FIG. 1 is an overview diagram of a preferred embodiment of a cellular communication system in accordance with the present invention.

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates in response to changes in the propagation environment. While operating, the adaptive antenna attempts to maximize the reception of the signal received from a desired transmitting device, as it simultaneously minimizes the effects of all other interfering signals and noise. In a communication system, the interference suppression capability of an adaptive antenna array offers the potential to reduce co-channel interference, improve coverage quality, and increase overall system capacity.

Adaptive antenna arrays also offer the possibility of providing a new way of multiplexing multiple devices: Spatial Division Multiple Access (SDMA). With SDMA, multiple devices can simultaneously share the same channel (i.e., time, frequency, or code channel) and are separated and simultaneously decoded by the receiver array on the basis of their spatial position relative to the antenna array. When successfully deployed, SDMA promises to provide enormous increases in system capacity.

Spatial Division Multiple Access is a difficult technology to implement because of the rapidly varying multipath fading channel. In an SDMA system, the devices that are sharing a channel provide interference to the receiver processing algorithms that must decode the signals transmitted by the devices. When a receiver-processing algorithm attempts to decode one SDMA device, the other SDMA devices provide strong interference to the decoding algorithm. The adaptive antenna implementing SDMA suppresses the effects of the other devices when attempting to decode one of the transmitting devices.

A problem associated with employing both an equalizer and an adaptive antenna in a wireless communication system lies in the design of an algorithm and device having adequate ability to adapt to changes in the signal environment. For best performance, adaptive antennas that operate in a fast-fading multipath environment must adapt to the rapidly varying channel as well as to any changes in the nature of the desired and interfering signals. In a broadband system, a frequency-selective multipath channel will cause significant variations in the channel across the occupied bandwidth of the received signal. Equalization and interference-suppression algorithms, which cannot track these channel variations both in time and frequency, will suffer significant degradation in performance as measured by the Bit-Error Rate (BER) or Signal-to-Interference-plus-Noise Ratio (SINR).

A common ingredient in many equalizers and adaptive antenna arrays is an algorithm and device that estimates the characteristics of the multipath propagation environment, channel transfer function, or channel frequency response, between the desired transmitting device and each of the at least one receiving antenna at the communication receiver. When SDMA is being employed in a broadband system operating in a frequency-selective environment, then an adaptive antenna array generally requires an estimate of the channel frequency response between each receiving antenna and each of the transmitting devices that are simultaneously sending information to the array. The channel estimation algorithm in this case should operate to simultaneously solve for the channel responses of the multiple transmitting devices.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the time-varying frequency response of a broadband system accurately enough to permit effective equalization and interference suppression. Given the difficulties associated with implementing SDMA and the deleterious nature of the multipath-fading environment, such a device would enable improved equalization and interference suppression performance in a mobile broadband communication system.

Briefly described, the present invention is a method and device for calculating the channel frequency responses of the signals transmitted by at least one transmitting device and received on at least one receive antenna. The invention utilizes gradient optimization techniques and efficient Discrete Fourier Transform (DFT) processing that significantly lowers channel estimation complexity with no loss in channel estimation performance. Using this method eliminates the need to compute the inverse of a very large matrix that is required by most multi-user channel estimators. Also, this invention eliminates problems associated with channel estimations at edge subcarriers in OFDM (Orthogonal Frequency Division Multiplexing), thus providing improved symbol estimation performance.

The method and device of the present invention can be incorporated into a communications receiving device, base station, or subscriber unit. In the present invention, the term "device" can refer to any type of communications device such as a base station, subscriber unit, or other communications receiver or transmitter.

The present invention is implemented in a communication system where at least one desired transmitting device transmits information to a communication receiver having at least one antenna. In a preferred embodiment, pluralities of transmitting devices simultaneously transmit information to a communication receiver having a plurality of antennas. A transmitting device transmits its information in bursts that contain two components: a training interval and a data interval, also called blocks. The information transmitted in a training interval contains pilot symbol sequences of content and duration known by both the transmitting device and the communication receiver. The data interval contains data symbols that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

The ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit. Devices incorporating algorithms for providing this capability must have the ability to track any variations in the time and frequency-selective channel. The method and device of the present invention provide time-varying channel estimates for use in adaptive antenna equalization estimation techniques, making communication systems more efficient.

A preferred embodiment of the present invention described below typically operates in a time-varying delay-spread channel and operates under the assumption that the channel can change significantly over the occupied bandwidth and significantly in time. This requires a frequency-domain multi-user channel estimation technique for tracking the time and frequency variations of multiple SDMA users sharing the same time frequency channel.

FIG. 1, numeral 100, illustrates a wireless communication system in accordance with the preferred embodiment of the present invention. As shown in FIG. 1, a Base Station 110 provides communication service to a geographic region known as a cell 103. At least one User Devices 120 and 130 communicate with the Base Station 110. In some embodiments of the communication system of FIG. 1, at least zero External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature and number of the External Interference Sources 140 will depend on the specific embodiment of the communication system of FIG. 1. In some cases, as is shown in FIG. 1, an External Interference Source will be another User Device 140 (similar in construction and purpose to User Device 120) that is communicating with another Base Station 112 in the same frequency spectrum allocated to Base Station 110 and User Devices 120 and 130. As shown in FIG. 1, User Devices 120 has a single antenna, while User Devices 130 have at least one antenna. The method and device of the present invention can be implemented as part of a Base Station 110 as well as part of a User Device 120 or 130.

Figure 2:
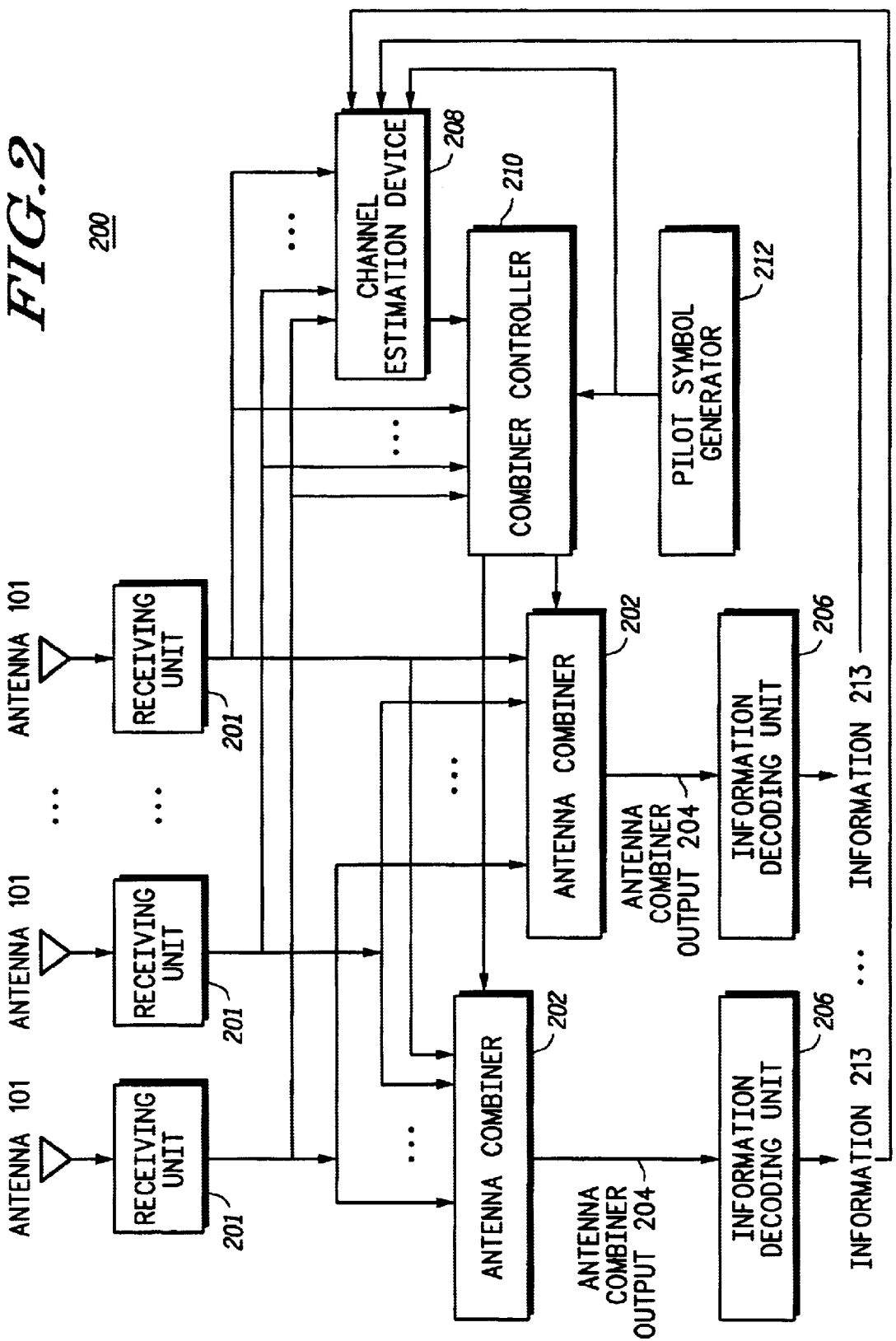
FIG. 2 is a block diagram illustrating a preferred embodiment of a device in accordance with the present invention.

FIG. 2, numeral 200, is a block diagram illustrating a device in accordance with the present invention. The communication receiver in accordance with the present invention includes at least one antenna (101) wherein the outputs of the antennas are each provided to a receiving unit (201). The outputs of the receiving units (201) are provided to at least one Antenna Combiner (202). The signals from the receiving units (201) are also fed into the Combiner Controller (210), which regulates the operation of the at least one Antenna Combiner (202). The signals from the receiving units (201) are also fed into the Channel Estimation Device (208). The Pilot Symbol Generator (212) generates pilot symbol information that is used by the Combiner Controller (210) to control the Antenna Combiner (202). The pilot symbol information generated by the Pilot Symbol Generator (212) is also used by the Channel Estimation Device (208) to estimate the time-varying frequency responses of the transmitting devices (110, 112, 120,130, or 140, or any combination thereof). The output of an Antenna Combiner (202) is fed into an Information Decoding Unit (206), which decodes the Antenna Combiner Output (204) and generates data information (213) that was received by the Antennas (101). The output of the information decoding unit (206) is fed into the channel estimation device (208) to estimate the time-varying frequency response of the transmitting devices.

Figure 3:
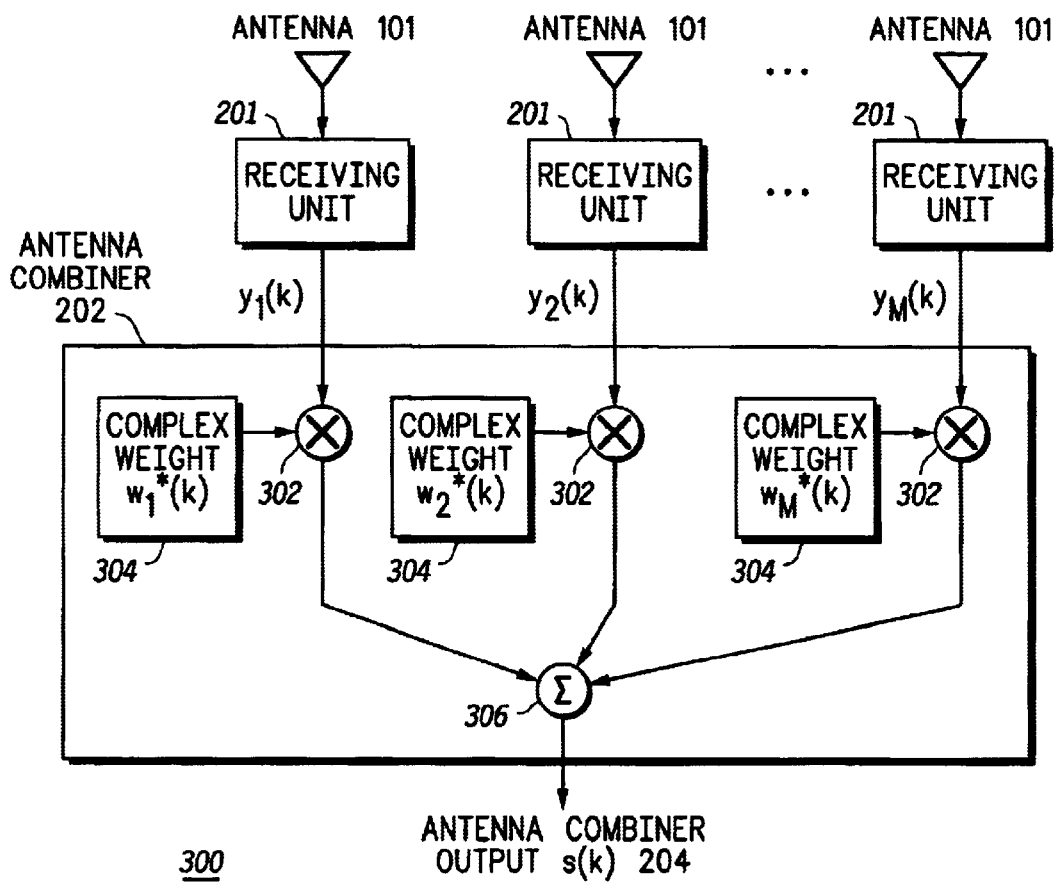
FIG. 3 is a block diagram illustrating details of the Antenna Combiner of the device of FIG. 2.

FIG. 3, numeral 300, is a block diagram illustrating details of the Antenna Combiner of the device of FIG. 2. Antenna Combiner (202) is coupled to the receiving units (201), which in turn are coupled to the antennas (101). In a preferred embodiment, the receiving units (201) may include radio frequency pre-amplifiers, filters, and other devices that can be used to convert the radio frequency signal received by the antenna down to a digital stream of base b and equivalent complex symbols. As shown in FIG. 2, the output of the i'th receiving unit (201) (where i is an integer between 1 and M inclusive, and M is the total number of antenna elements) is mathematically denoted by $y_i(k)$, where k and i are integers, and is provided to the antenna combiner (202) which can be in the form of a plurality of complex multipliers (302) which multiply the output of each receiving unit (201) by a complex weight (304), mathematically denoted as $w_i(k)$, and a combiner (306) sums the outputs of the plurality of complex multipliers (302). The values of the complex weights (304) are controlled by the Combiner Controller (210), shown in FIG. 2.

Figure 4:
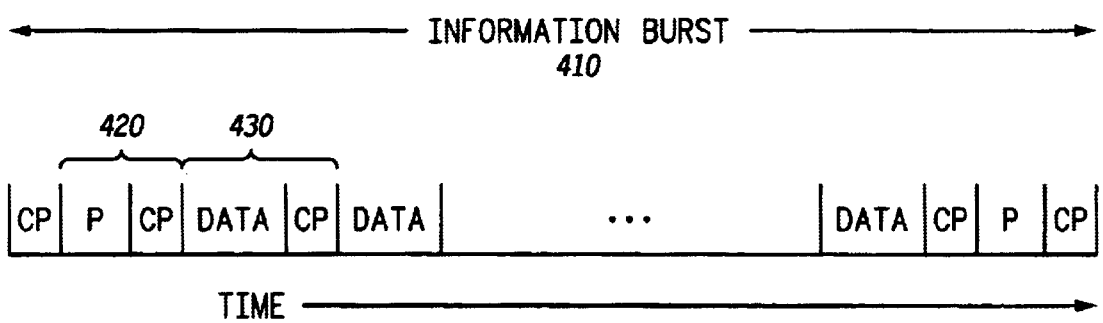
FIG. 4 is a representation of an information burst for Single or Multi-carrier Modulation, which can be used by the communication system in which the device in FIG. 2 operates.

FIG. 4, numeral 400, is a timing diagram illustrating the structure of an information burst for single or multi-carrier modulation (410) transmitted between a plurality of transmitting devices (e.g., Base station 110, User Device 120, or 130) and a receiving device (e.g., Base station 110, User Device 120, or 130). An information burst (410) includes at least one training interval (420) also referred to as a pilot block, and at least one data interval (430) also referred to as a data block. During a training interval (420), a transmitting device (e.g., a Base station 110, or a User Device 120, or a User Device 130, or a base station 112, or in some cases a User Device 140, or any combination thereof) transmit training information consisting of at least one pilot symbol of duration, content, and timing known to both the transmitting device and the receiving device (a Base station 110, or a User Device 120, or a User Device 130). The Channel Estimation Device (208) in the present invention uses the outputs of the receiving units (201) during at least one of the training intervals (420) and the knowledge of the transmitted sequence of pilot symbols to compute an estimate of the channel time and frequency response between the plurality of transmitting devices (a Base station 110 or 112, or a User Device 120, 130, or 140, or any combination thereof) and the antennas (101) of the receiving device. To update the channel estimate, the channel estimation device (208) in the present invention uses the outputs of the information decoding units (206) and the outputs of the receiving units (201) during at least one data interval (430) to compute an estimate of the channel time and frequency response between the plurality of transmitting devices (a Base station 110 or 112, or a User Device 120, 130, or 140, or any combination thereof) and the antennas (101) of the receiving device. This information burst acts in accordance with all channel estimations using cyclic prefixes.

The channel estimation device for the present invention utilizes the mathematical architecture of gradient optimization. Gradient optimization is a finite iterative procedure for solving a system of n equations in n unknowns. A description of a frequency-domain channel estimation based on gradient optimization techniques is now given:

For the derivation of the gradient methods, assume that the entire block of symbols (e.g., 420 or 430 in FIG. 4) to be processed (in OFDM this block is sometimes referred to as a baud or as an OFDM symbol interval) is of known symbols (either pilots, if the block is 420, or symbol decisions, if the block is 430). The approach to be described can be extended to arbitrary pilot formats as well. Also the following derivation will be given for one of the at least one receiving antennas. An OFDM (Orthogonal Frequency Division Multiplexing) system is assumed, although the derivation is applicable to any system employing frequency-domain processing. The OFDM system described below employs an FFT size of N, and K frequency-domain subcarriers are employed to transmit information (either pilot or data). Also, in the following derivation, the term "user" is used to refer to a transmitting antenna so that the derivation will be applicable to conventional single user systems, SDMA (Spatial Division Multiple Access) systems, MIMO (Multiple-Input-Multiple-Output) systems, space-time-coding systems, or any other related system having at least one transmitting antennas and at least one receiving antenna. Additionally in the following derivations, the symbol decisions do not necessarily have to be hard sliced to actual symbol values. Some type of soft decision can be used such as hyperbolic tangent mappings.

The received data on one of the receive antennas, ignoring noise and unknown interference, is given as:

$$Y(k, b) = \sum_{j=1}^{J} H_j(k, b) x_j(k, b) \tag{1}$$

where k is the subcarrier number (k ranges from 1 to K), b is a number identifying the baud being processed (b ranges from 1 to B), J is the number of Spatial Division Multiple Access (SDMA) users (the number of devices or antennas transmitting simultaneously), $H_j(k,b)$ is user j's frequency-domain channel at subcarrier k, baud b, and $x_j(k,b)$ is user j's frequency-domain symbol on subcarrier k, baud b (in single carrier, $x_j(k,b)$ is the DFT of user j's K time-domain symbols). In a preferred environment, the Discrete Fourier Transform (DFT's) are replaced by Fast Fourier Transform (FFT's) to simplify calculations. $H_j(k,b)$ is mathematically modeled as the N-point DFT (N≧K) of a length L sequence, $h_j(l,b)$ (where l=0,1, ... L−1 or any other appropriate length L integer sequence), of time-domain tap gains (called time-taps) as follows: (Note that the length L sequence $h_j(l,b)$ can vary as a function of the baud index b.)

$$H_j(k, b) = \sum_{l=0}^{L-1} h_j(l, b) e^{-i2\pi k/N} \tag{2}$$

In single carrier employing frequency-domain receive processing K=N, but in OFDM, N>K so that the estimator assumes a low correlation between the channel at subcarrier k=1 and the channel at subcarrier k=K.

In matrix form and extended to all K subcarriers, the previous equation becomes:

$$(K \times 1) H_j(b) = \begin{bmatrix} H_j(1, b) \\ \vdots \\ H_j(K, b) \end{bmatrix} = F h_j(b) \tag{3}$$

where:

$$(K \times L) F = \begin{bmatrix} f^H(0) \\ \vdots \\ f^H(K-1) \end{bmatrix}, \quad (L \times 1) f(k) = \begin{bmatrix} 1 \\ e^{j2\pi k/N} \\ \vdots \\ e^{j2\pi (L-1)k/N} \end{bmatrix}, \tag{4}$$

$$(L \times 1) h_j(b) = \begin{bmatrix} h_j(0, b) \\ \vdots \\ h_j(L-1, b) \end{bmatrix}$$

The received data on baud b at each subcarrier, stacked into a vector, Y(b), can be written as:

$$(K \times 1) Y(b) = \begin{bmatrix} Y(1, b) \\ \vdots \\ Y(K, b) \end{bmatrix} = \sum_{j=1}^{J} X_j(b) F h_j(b) = X(b) D h(b). \tag{5}$$

where $(K \times K) X_j(b) = \text{diag}(x_j(1, b), \ldots, x_j(k,b))$, (diag means the matrix is composed of all zeros except for the diagonal elements which are given in parenthesis) and $$(K \times JK) X(b) = [X_1(b) \ldots X_j(b)], \tag{6}$$

$$(JK \times JL) D = \begin{bmatrix} F & 0 & \cdots & 0 \\ 0 & F & \ddots & \vdots \\ \vdots & \ddots & \ddots & 0 \\ 0 & \cdots & 0 & F \end{bmatrix}, \quad (JL \times 1) h(b) = \begin{bmatrix} h_1(b) \\ \vdots \\ h_j(b) \end{bmatrix}$$

The least squares estimator is the solution to the following minimization problem:

$$\min_{h(b)} |X(b) D h(b) - Y(b)|^2 = \min_{h(b)} h^H(b) D^H X^H(b) X(b) D h(b) - \tag{7}$$
$$h^H(b) D^H X^H(b) Y(b) - Y^H(b) X(b) D h(b) + Y^H(b) Y(b)$$

The gradient of the previous equation with respect to h(b) is given as (where a multiplicative factor of 2 is neglected to improve the clarity of the presentation):

$$\Delta h(b) = D^H X^H(b) X(b) D h(b) - D^H X^H(b) Y(b) \tag{8}$$

where $^H$ is the conjugate transpose. When computing this gradient, note that a matrix multiplication by the large matrix D can be implemented as J N-point DFT's with each DFT truncated to the first K samples. Also, multiplication by $D^H$ can be implemented as J N-point inverse Discrete Fourier transform (IDFTs) with each IDFT truncated to the first L samples,. Note that X(b) is a sparse matrix, so only JK complex multiplies are required when it is multiplied by a JK×1 vector. In other words, in computing the above gradient, Dh(b) can be found by taking a separate FFT of each user's L time taps in h(b), truncating each to K samples, and then stacking the result into a JK×1 vector. Then X(b)(Dh(b)) can be found by JK complex multiplies (and some addition operations). Next $X^H$(b)(X(b)(Dh(b))) can be found by JK complex multiplies, and finally, $D^H(X^H$(b)(X(b)(Dh(b)))) can be found through J N point IFFTs truncated to L samples and stacked into a JL×1 vector. Calculating the gradient with these methods (that is, with the DFT or FFT operations) requires significantly less operations than if matrix multiplication operations are carried out directly as written in the Equation (8)). It is these observations that lead to a low computational complexity decision-directed algorithm based on the gradient methods of optimization. These processes are described in the following two lists of steps (the first for the gradient method, the second for the conjugate gradient method) but are explained in detail with FIG. 5, through FIG. 8.

Fixed Step Size and Steepest Descent Gradient Method

1. $z_o = D^H X^H(b)Y(b)$, t=0,
   $\theta_0 = z_o$ unless in decision-directed mode where $\theta_0 = h(b-1)$
2. $d_t = z_o - D^H X^H(b)X(b)D\theta_t, \theta_{t+1} = \theta_t + \alpha_t d_t$
   where $\alpha_t = 1$ for fixed step size gradient and for steepest descent it equals:

$$\alpha_t = \frac{d_t^H d_t}{v_t^H v_t} \quad v_t = X(b)Dd_t$$

3. t=t+1. If $t > t_{end}$ then stop and $h(b) = \theta_t$, else go to 2

Conjugate Gradient Method

1. $z_o = D^H X^H(b)Y(b)$, t=0,
   $\theta_0 = z_o$ unless in decision-directed mode where $\theta_0 = h(b-1)$
2. $g_0 = D^H X^H(b)X(b)D\theta_0 - z_o$, $d_0 = -g_0$ 3. $\alpha_t = -\frac{g_t^H d_t}{d_t^H v_t} \quad v_t = D^H X^H(b)X(b)Dd_t$ 4. $\theta_{t+1} = \theta_t + \alpha_t d_t$
5. $g_{t+1} = D^H X^H(b)X(b)D\theta_t - z_o$ 6. $\beta_t = \frac{g_{t+1}^H v_t}{d_t^H v_t}$ 7. $d_{t+1} = -g_{t+1} + \beta_t d_t$
8. t=t+1. If $t = t_{end}$ then stop and $h(b) = \theta_t$, else go to 3.

Figure 5:
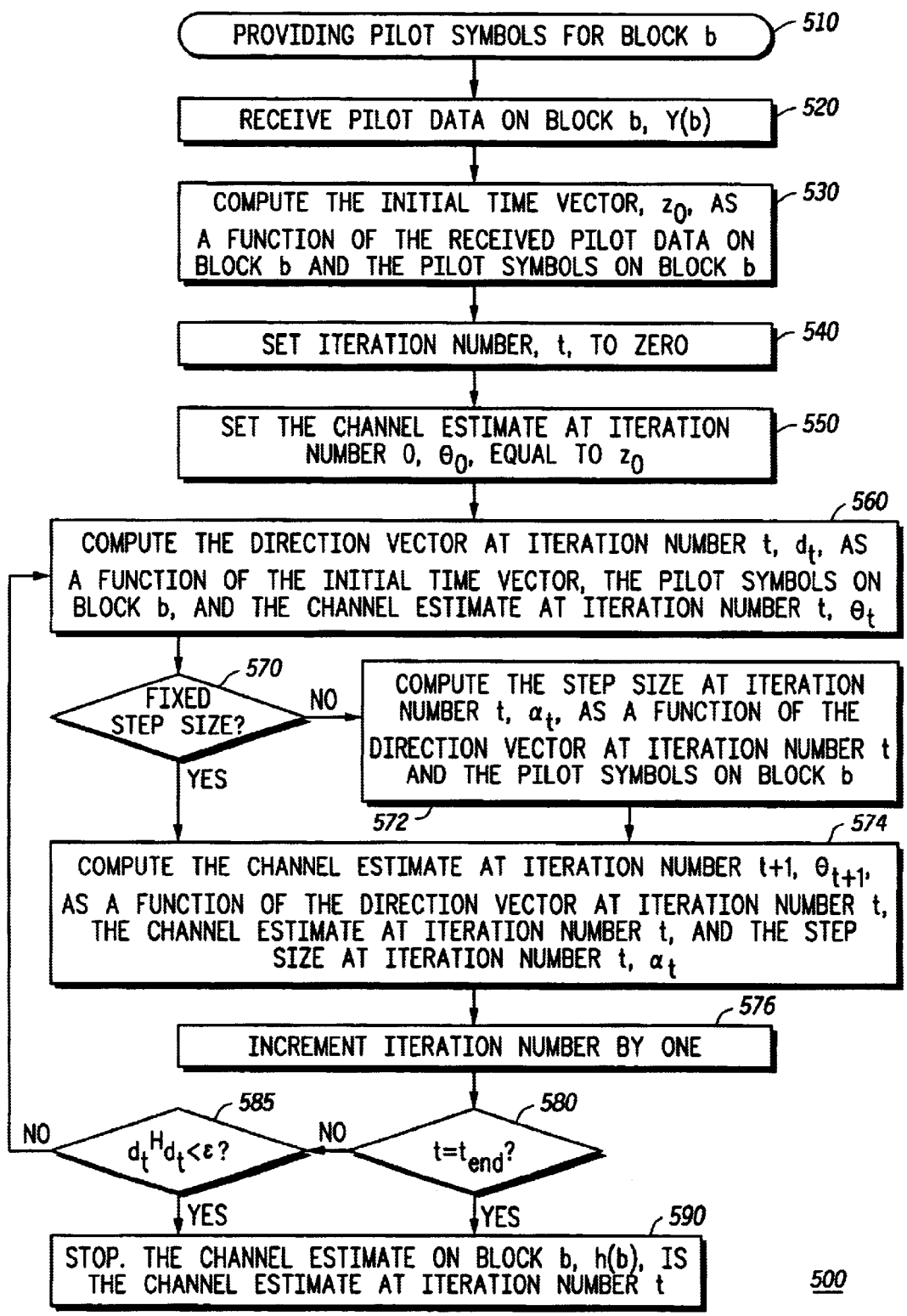
FIG. 5 is a flow chart representation of one embodiment of the method performed by the Channel Estimation Device (208) to provide channel estimation for pilot blocks between a transmitting device and a receiving antenna in accordance with the present invention.

FIG. 5 shows a flow chart that illustrates the steps performed by the Channel Estimation Device (208) when the fixed step size gradient or steepest decent gradient method is used. This is in accordance with the present invention when block b (equation 1) is a pilot block (420). The pilot symbols for block b 510 are provided by the Pilot Symbol Generator 212. After receiving the pilot symbols and the pilot data (520) on block b, their information is stacked into a vector Y(b) and is equated as $$(K \times 1) Y(b) = \begin{bmatrix} Y(1, b) \\ \vdots \\ Y(K, b) \end{bmatrix}.$$

The initial time vector, $z_o$, is computed (530) as a function of the received pilot data on block b and the pilot symbols on block b, the pilot block b being the segment 420. This is such that $z_o = D^H X^H(b)Y(b)$ where:

$$(K \times JK)X(b) = [X_1(b) \ldots X_J(b)], (JK \times JL)D = \begin{bmatrix} F & 0 & \cdots & 0 \\ 0 & F & \ddots & \vdots \\ \vdots & \ddots & \ddots & 0 \\ 0 & \cdots & 0 & F \end{bmatrix}$$

(K×K) $X_j(b) = \text{diag}(x_j(1,b), \ldots, x_j(K,b))$ diag means the matrix is composed of all zeros except for the diagonal elements which are given in parenthesis. $x_j(1,b)$ is user j's pilot symbol on subcarrier k and block b. For the matrix above, F is determined by:

$$(K \times L)F = \begin{bmatrix} f^H(0) \\ \vdots \\ f^H(K-1) \end{bmatrix}, \text{ where } (L \times 1)f(k) = \begin{bmatrix} 1 \\ e^{j2\pi k/N} \\ \vdots \\ e^{j2\pi(L-1)k/N} \end{bmatrix}$$

(In the preferred embodiment, $z_o = D^H X^H(b)Y(b)$, would be computed by FFT's and an element-wise multiplication of two vectors.) Next (540) the iteration number t, is set to zero. The initialization also requires that the channel estimate at iteration number 0, $\theta_0$, be equal to an initial channel estimate. In the preferred embodiment, the initial channel estimate is the initial time vector $z_o$ (550). Next, in block 560, the direction vector d, is computed at iteration number t, forming $d_t$ as a function of the initial time vector, the pilot symbols on block b, and the channel estimate at iteration number t, $\theta_t$. The direction vector is used to determine how big a step should be computed for the next iteration of process' 560 through 585. The equation for (560) is $d_t = z_o - D^H X^H(b)X(b)D\theta_t$. (570) If the step size is not fixed ($\alpha_t \neq \alpha_0$, where $\alpha_0$ where is a constant) then (672) the step size is computed at iteration number t, $\alpha_t$, as a function of the direction vector at iteration number t and the pilot symbols on block b. The equation for 672 is $$\alpha_t = \frac{d_t^H d_t}{v_t^H v_t}$$

where $v_t = X(b)Dd_t$. 570 The channel estimate is computed at iteration number t+1, $\theta_{t+1}$, as a function of the direction vector at iteration number t, the channel estimate at iteration number t, and the step size at iteration number t, $\alpha_t$ (574). The equation for 574 is $\theta_{t+1} = \theta_t + \alpha_t d_t$. At this point the iteration number is increased by one (576). If the iteration number t equals $t_{end}$ (580), $t_{end}$ being the number where the channel estimator should stop iterating, then the channel estimate on block b, h(b), is the channel estimate at iteration number t (590). $t_{end}$ is predetermined for the receiving device, and is dependent on its processor power and memory limitations. If $d_t^H d_t < \epsilon$ (585), where $d_t^H d_t$ is the magnitude squared of the direction vector, and in the preferred embodiment, $\epsilon$ is a small percentage (e.g., 1%) of the theta information ($\theta^H \theta$), the channel estimate on block b, h(b), is the channel estimate at iteration t (590). Otherwise the process is repeated from block 560 on until the conditions t equals $t_{end}$, or $d_t^H d_t < \epsilon$ are met, at which point the channel estimate on block b, h(b), is the channel estimate at iteration t (590).

Figure 6:
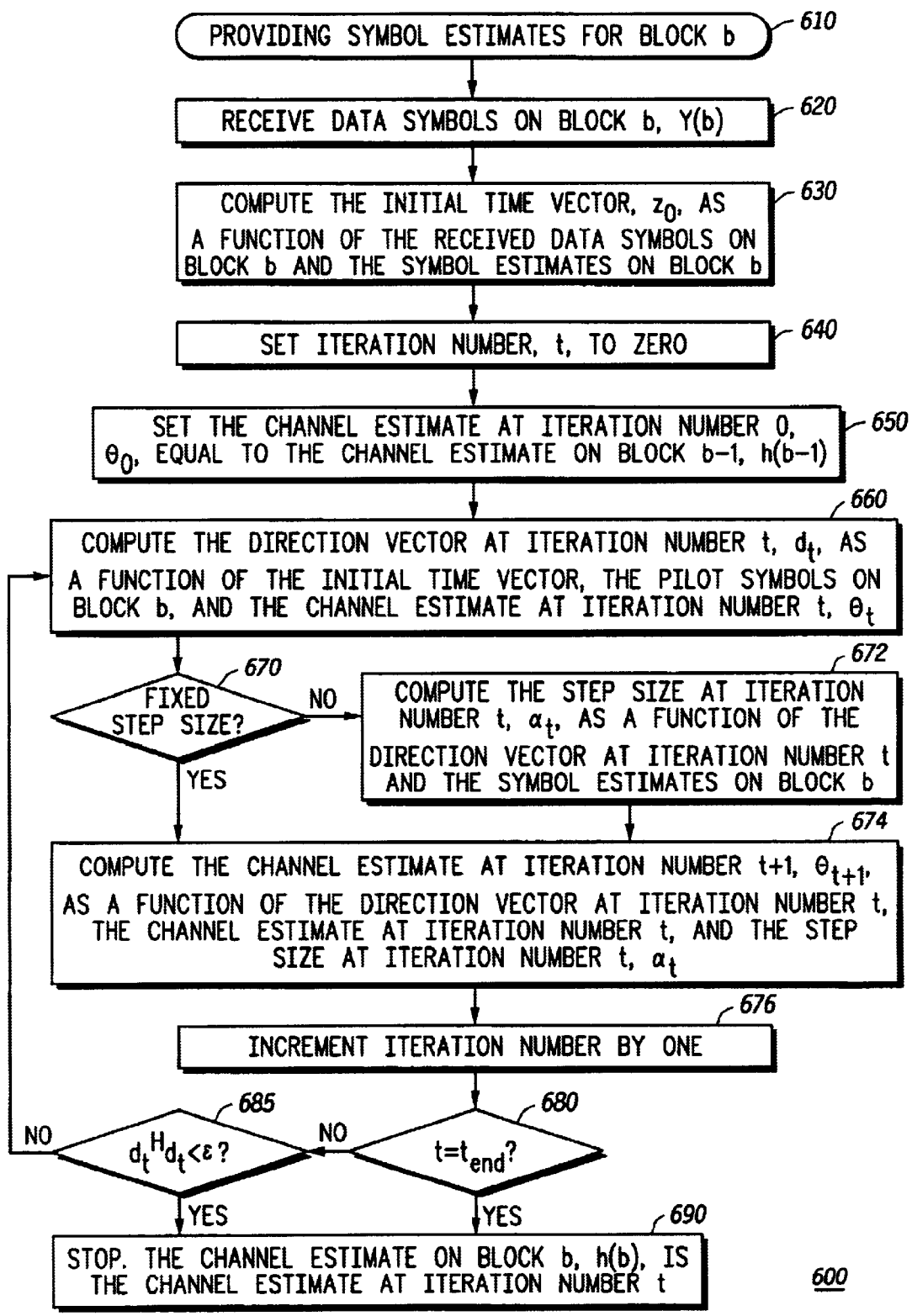
FIG. 6 is a flow chart representation of one embodiment of the method performed by the Channel Estimation Device (208) to provide channel estimation for data blocks between a transmitting device and a receiving antenna in accordance with the present invention.

FIG. 6 shows a flow chart that illustrates the steps performed by the Channel Estimation Device (208) when the fixed step size gradient or steepest decent gradient method is used. This is in accordance with the present invention when block b (equation 1) is a data block (430). Symbols for block b, $x_j(k,b)$, (610) are provided by the information decoding unit (206) where $x_j(k,b)$ is user j's symbol. After receiving the data (620) on block b, it is stacked into a vector and equated as $$(K \times 1) Y(b) = \begin{bmatrix} Y(1,b) \\ \vdots \\ Y(K,b) \end{bmatrix}.$$

The initial time vector, $z_o$, is computed (630) as a function of the received data on block b and the symbol estimates on block b. This is such that $z_o = D^H X^H(b) Y(b)$ where:

$$(K \times JK) X(b) = [X_1(b) \ \ldots \ X_J(b)], \ (JK \times JL) D = \begin{bmatrix} F & 0 & \cdots & 0 \\ 0 & F & \ddots & \vdots \\ \vdots & \ddots & \ddots & 0 \\ 0 & \cdots & 0 & F \end{bmatrix}$$

(K×K) $X_j(b) = \text{diag}(x_j(1,b), \ldots, x_j(K,b))$, diag means the matrix is composed of all zeros except for the diagonal elements which are given in parenthesis. $x_j(1,b)$ is user j's symbol estimate on subcarrier k and block b. For the matrix above, F is determined by:

$$(K \times L) F = \begin{bmatrix} f^H(0) \\ \vdots \\ f^H(K-1) \end{bmatrix}, \ \text{where} \ (L \times 1) f(k) = \begin{bmatrix} 1 \\ e^{j2\pi k/N} \\ \vdots \\ e^{j2\pi(L-1)k/N} \end{bmatrix}$$

(In the preferred embodiment, $z_o = D^H X^H(b) Y(b)$, would be computed by FFT's and an element-wise multiplication of two vectors). Next, (640) the iteration number t, is set to zero. The initialization also requires (650) that the channel estimate at iteration number 0, $\theta_0$, be equal to an initial channel estimate. In the preferred embodiment, the initial channel estimate is the channel estimate on block b−1, h(b−1). This is the channel estimate that has been previously computed for the block 590 if block b−1 is a pilot block and 690 if block b−1 is a data block. In block 660, the direction vector d, is computed at iteration number t, forming $d_t$, as a function of the initial time vector, the symbols estimates on block b, and the channel estimate at iteration number t, $\theta_t$. The direction vector is used to determine how big a step should be computed for the next iteration of process' 660 through 685. The equations for (660) are: $d_t = z_o - D^H X^H(b) X(b) D \theta$ where $v_t = X(b) D d_t$. (670) If the step size in not fixed ($\alpha_t \neq \alpha_0$, where $\alpha_0$ is a constant) then (672) the step size is computed at iteration number t, $\alpha_t$, as a function of the direction vector at iteration number t and the pilot symbols on block b. The equation for (672) is:

$$\alpha_t = \frac{d_t^H d_t}{v_t^H v_t}.$$

670 The channel estimate is computed at iteration number t+1, $\theta_{t+1}$, as a function of the direction vector at iteration number t, the channel estimate at iteration number t, and the step size at iteration number t, $\alpha_t$ (674). The equation for 674 is $\theta_{t+1} = \theta_t + \alpha_t d_t$. At this point the iteration number is increased by one (676). If the iteration number t equals $t_{end}$ (680), $t_{end}$ being the number where the channel estimator should stop iterating, then the channel estimate on block b, h(b), is the channel estimate at iteration number t (690). $t_{end}$ is predetermined for the receiving device, and is dependent on its processor power and memory limitations. If $d_t^H d_t < \epsilon$ (685), where $d_t^H d_t$ is the magnitude squared of the direction vector, and in the preferred embodiment, $\epsilon$ is a small percentage (e.g., 1%) of the theta information ($\theta^H \theta$), the channel estimate on block b, h(b), is the channel estimate at iteration t (690). Otherwise the process is repeated from block 660 on until the conditions t equals $t_{end}$, or $d_t^H d_t < \epsilon$ are met, at which point the channel estimate on block b, h(b), is the channel estimate at iteration t (690).

FIG. 7 shows a flow chart that illustrates the steps performed by the Channel Estimation Device (208) when the conjugate gradient method is used. This is in accordance with the present invention when block b (equation 1) is a pilot block (420). The Pilot Symbol Generator 212 provides the pilot symbols for block b (710). After receiving the pilot data (715) on block b, where $$(K \times 1) Y(b) = \begin{bmatrix} Y(1,b) \\ \vdots \\ Y(K,b) \end{bmatrix},$$

the initial time vector, $z_o$, is computed (720) as a function of the received pilot data on block b and the pilot symbols on block b, the pilot block b being the segment 420. This is such that $z_o = D^H X^H(b) Y(b)$ where:

$$(K \times JK) X(b) = [X_1(b) \ \ldots \ X_J(b)], \ (JK \times JL) D = \begin{bmatrix} F & 0 & \cdots & 0 \\ 0 & F & \ddots & \vdots \\ \vdots & \ddots & \ddots & 0 \\ 0 & \cdots & 0 & F \end{bmatrix}$$

(K×K) $X_j(b) = \text{diag}(x_j(1,b), \ldots, x_j(K,b))$ diag means the matrix is composed of all zeros except for the diagonal elements which are given in parenthesis. $x_j(1,b)$ is user j's pilot symbol or symbol estimate on subcarrier k and block b. For the matrix above, F is determined by:

$$(K \times L) F = \begin{bmatrix} f^H(0) \\ \vdots \\ f^H(K-1) \end{bmatrix}, \ \text{where} \ (L \times 1) f(k) = \begin{bmatrix} 1 \\ e^{j2\pi k/N} \\ \vdots \\ e^{j2\pi(L-1)k/N} \end{bmatrix}$$

(In the preferred embodiment, $z_o = D^H X^H(b) Y(b)$, would be computed by FFT's and an element-wise multiplication of two vectors). Next (725) the iteration number t, is set to zero. The initialization also requires that the channel estimate at iteration number 0, $\theta_0$, be equal to an initial channel estimate. In the preferred embodiment, the initial channel estimate is $z_o$ (730). In block 735, the gradient vector g is computed at iteration number 0, forming $g_0$ as a function of the initial time vector, the pilot symbols on block b, and the channel estimate at iteration number 0. The equation for 735 is $g_0=D^H X^H(b)X(b)D\theta_0-z_o$. Then the direction vector d is computed at iteration number 0, forming $d_0$ as the negative of the gradient vector at iteration number 0 (740). The permuted direction vector v is computed at iteration number t, as a function of the direction vector at iteration number t and the pilot symbols on block b forming $v_t$, (745). The full equation for 745 is $v_t=D^H X^H(b)X(b)Dd_t$. Utilizing the equation $$\alpha_t = -\frac{g_t^H d_t}{d_t^H v_t},$$

the first step size $\alpha$ is computed at iteration number t, as a function of the direction vector at iteration number t, the gradient vector at iteration number t, and the permuted direction vector at iteration number t forming $\alpha_t$, (750). Block 755 computes the channel estimate at iteration number t+1, as a function of the direction vector at iteration number t, the channel estimate at iteration number t, and the first step size at iteration number t, forming $\theta_{t+1}$, using the equation $\theta_{t+1}=\theta_t+\alpha_t d_t$. Next the gradient vector g is computed at iteration number t+1 as a function of the initial time vector, the pilot symbols on block b, and the channel estimate at iteration number t where $g_{t+1}=D^H X^H(b)X(b)D\theta_t-z_o$ (760). The second step size $\beta$ is computed at iteration number t as a function of the direction vector at iteration number t, the gradient vector at iteration number t+1, and the permuted direction vector at iteration number t forming $\beta_t$, (765). This is illustrated as $$\beta_t = \frac{g_{t+1}^H v_t}{d_t^H v_t}.$$

Block 770 computes the direction vector at iteration number t+1, $d_{t+1}$, as a function of the gradient vector at iteration number t+1, the second step size at iteration number t, and the direction vector at iteration number t using the equation $d_{t+1}=-g_{t+1}+\beta_t d_t$. At this point the iteration number t is increased by one (775). If the iteration number t equals $t_{end}$ (780), $t_{end}$ being the number where the channel estimator should stop iterating, the channel estimate on block b, h(b), is the channel estimate at iteration number t (790). $t_{end}$ is predetermined for the receiving device, and is dependent on its processor power and memory limitations. If $d_t^H d_t < \epsilon$ (785), where $d_t^H d_t$ is the magnitude squared of the direction vector and in the preferred embodiment, $\epsilon$ is some small percentage (e.g., 1%) of the theta information ($\theta^H\theta$), the channel estimate on block b, h(b), is the channel estimate at iteration number t (790). Otherwise the process from block 745 through 785 is repeated until the conditions t equals $t_{end}$, or $d_t^H d_t < \epsilon$ are met, at which point the channel estimate on block b, h(b), is the channel estimate at iteration t (790).

FIG. 8 shows a flow chart that illustrates the steps performed by the Channel Estimation Device (208) when the conjugate gradient method is used. This is in accordance with the present invention when block b (equation 1) is a data block (810), the data block b being the segment 430. Symbols for block b, $x_j(k,b)$ (810) are provided by the information decoding unit (206) where $x_j(k,b)$ is user j's symbol. After receiving the pilot data on block b, where $$(K \times 1)Y(b) = \begin{bmatrix} Y(1,b) \\ \vdots \\ Y(K,b) \end{bmatrix}$$

is true, the initial time vector, $z_o$, is computed (820) as a function of the received data symbols 815 and the symbol estimates 810. This is such that $z_o=D^H X^H(b)Y(b)$ where:

$$(K \times JK)X(b) = [X_1(b) \ \ldots \ X_J(b)], \quad (JK \times JL)D = \begin{bmatrix} F & 0 & \cdots & 0 \\ 0 & F & \ddots & \vdots \\ \vdots & \ddots & \ddots & 0 \\ 0 & \cdots & 0 & F \end{bmatrix}$$

(K×K) $X_j(b)$=diag($x_j(1,b), \ldots, x_j(K,b)$)) Diag means the matrix is composed of all zeros except for the diagonal elements which are given in parenthesis. $x_j(1,b)$ is user j's symbol estimate on subcarrier k and block b. For the matrix above, F is determined by:

$$(K \times L)F = \begin{bmatrix} f^H(0) \\ \vdots \\ f^H(K-1) \end{bmatrix}, \quad \text{where } (L \times 1)f(k) = \begin{bmatrix} 1 \\ e^{j2\pi k/N} \\ \vdots \\ e^{j2\pi(L-1)k/N} \end{bmatrix}$$

(In the preferred embodiment, $z_o=D^H X^H(b)Y(b)$, would be computed by FFT's and an element-wise multiplication of two vectors). Next (825) the iteration number t, is set to zero. The initialization also requires that the channel estimate at iteration number 0, $\theta_0$, be equal to an initial channel estimate. In the preferred embodiment, the initial channel estimate is equal to the channel estimate at block b−1, h(b−1) (830). This is the channel estimate that has been previously computed for the block 790 if block b−1 is a pilot block and 890 if block b−1 is a data block. In block 835, the gradient vector g is computed at iteration number 0, forming $g_0$ as a function of the initial time vector, the symbol estimates on block b, and the channel estimate at iteration number 0. The equation for 835 is $g_0=D^H X^H(b)X(b)D\theta_0-z_o$. Then the direction vector d is computed at iteration number 0, forming $d_0$ as the negative of the gradient vector at iteration number 0 (840). The permuted direction vector v is computed at iteration number t, as a function of the direction vector at iteration number t and the symbol estimates on block b forming $v_t$, (845). The full equation for 845 is $v_t=D^H X^H(b)X(b)Dd_t$. Utilizing the equation $$\alpha_t = -\frac{g_t^H d_t}{d_t^H v_t},$$

the first step size $\alpha$ is computed at iteration number t, as a function of the direction vector at iteration number t, the gradient vector at iteration number t, and the permuted direction vector at iteration number t forming $\alpha_t$, (850). Block 855 computes the channel estimate at iteration number t+1, as a function of the direction vector at iteration number t, the channel estimate at iteration number t, and the first step size at iteration number t, forming $\theta_{t+1}$, using the equation $\theta_{t+1}=\theta_t+\alpha_t d_t$. Next the gradient vector g is computed at iteration number t+1 as a function of the initial time vector, the symbol estimates on block b, and the channel estimate at iteration number t where $g_{t+1}=D^H X^H(b)X(b)D\theta_t-z_o$ (860). The second step size $\beta$ is computed at iteration number t as a function of the direction vector at iteration number t, the gradient vector at iteration number t+1, and the permuted direction vector at iteration number t forming $\beta_t$, (865). This is illustrated as $$\beta_t = \frac{g_{t+1}^H v_t}{d_t^H v_t}.$$

Block 870 computes the direction vector at iteration number t+1, $d_{t+1}$, as a function of the gradient vector at iteration number t+1, the second step size at iteration number t, and the direction vector at iteration number t using the equation $d_{t+1}=-g_{t+1}+\beta_t d_t$. At this point the iteration number t is increased by one (875). If the iteration number t equals $t_{end}$ (880), $t_{end}$ being the number where the channel estimator should stop iterating, the channel estimate on block b, h(b), is the channel estimate at iteration number t (890). $t_{end}$ is predetermined for the receiving device, and is dependent on its processor power and memory limitations. If $d_t^H d_t < \epsilon$ (885), where $d_t^H d_t$ is the magnitude squared of the direction vector and in the preferred embodiment, $\epsilon$ is some small percentage (e.g., 1%) of the theta information ($\theta^H \theta$), the channel estimate on block b, h(b), is the channel estimate at iteration number t (890). Otherwise the process from block 845 through 885 is repeated until the conditions t equals $t_{end}$, or $d_t^H d_t < \epsilon$ are met, at which point the channel estimate on block b, h(b), is the channel estimate at iteration t (890).

There is a simpler, less complex approach to the above-mentioned gradient estimators if the end goal is to find channel estimates for multiple transmitting devices when the transmitting devices employ a known specially designed pilot sequence or when there is only a single transmitting device (either with known pilots or symbol decisions).

One example of a possible pilot sequence for transmitting device i is:

$$x_i(k,b) = b_T(k) e^{-j 2\pi k (i-1) L / N} \quad (9)$$

Where $b_T(k)$ is an arbitrary pilot sequence. Note that each of the J transmitting devices has the same pilot sequence except for the linear phase term. The phase term allows simple processing to recover each transmitting devices' channel response. The linear phase term means that when the received frequency-domain data, Y(k,b) is divided by the pilot sequence, $b_T(k)$, the noiseless result contains the sum of each transmitting device's channel multiplied by the linear phase term. Because each transmitting device is assumed to have L time taps that characterize its frequency response, we can run a single user version of the gradient approach that assumes JL time taps. Again because of the linear phase term, the first L taps will be the one transmitting device, the second L another transmitting device and so forth.

Note that in some cases quicker convergence of the gradient algorithms is possible by using a spacing greater than L. In other words, the L of Equation (9) is replaced by $\gamma L$ where $\gamma > 1$. When the gradient algorithms are applied, in the time-domain, one of the transmitting devices time-domain channel taps will be from 0 to L−1, the second will be from $\gamma L$ to $(\gamma+1)L-1$, and so forth.

A mathematical description of the gradient method with the linear phase shift of Equation (9) is now described. The extension to arbitrary phase shift and arbitrary pilot sequence is straight forward and involves modifying the definition of F(Y) and G(Y) given below to accommodate the subcarriers where there are pilots symbols and modifying where the time taps for each of the multiple transmitting devices are found after the IFFT processing.

The first step is to define the noisy channel estimate K×1 vector, $H_o(b)$, as:

$$H_o(b) = \begin{bmatrix} H_o(1, b) \\ \vdots \\ H_o(K, b) \end{bmatrix} \text{ where } H_o(k, b) = \frac{Y(k, b)}{b_T(k)} \quad (10)$$

Next we define F{y} to be the N-point IFFT of the K×1 vector y truncated to JL samples and scaled by N/sqrt(K) (for other linear phase shifts, the JL samples kept are the ones that correspond to each of the J transmitting devices time-domain channels whose location after the IFFT is specified by the phase shift). Also we define G{x} to be the N-point FFT of the JL×1 vector x truncated to K samples and scaled by 1/sqrt(K).

Fixed Step Size and Steepest Descent Linear Phase Shift Gradient Method 1. t=0, $\theta_t = F\{H_o(b)\}$
2. $d_t = \theta_0 - F\{G\{\theta_t\}\}$
   $\theta_{t+1} = \theta_t + \alpha_t d_t$
   where $\alpha_t = 1$ (or any appropriate scalar) for fixed step size gradient and for steepest descent it equals:

$$\alpha_t = \frac{d_t^H d_t}{v_t^H v_t} \quad v_t = G\{d_t\}$$

3. t=t+1. If $t > t_{end}$ then stop and $h(b) = \theta_t$, else go to 2

Conjugate Linear Phase Shift Gradient Method 1. t=0, $\theta_t = F\{H_o(b)\}$
2. $g_0 = F\{G\{\theta_t\}\} - \theta_0$, $d_0 = -g_0$ 3. $\alpha_t = -\frac{g_t^H d_t}{d_t^H v_t} \quad v_t = F\{G\{d_t\}\}$ 4. $\theta_{t+1} = \theta_t + \alpha_t d_t$
5. $g_{t+1} = F\{G\{\theta_t\}\} - \theta_0$ 6. $\beta_t = \frac{g_{t+1}^H v_t}{d_t^H v_t}$ 7. $d_{t+1} = -g_{t+1} + \beta_t d_t$
8. t=t+1. If $t > t_{end}$ then stop and $h(b) = \theta_t$, else go to 3

This description can also be implemented in FIGS. 6 through 9 providing the steps within the corresponding blocks of the figures are carried out in accordance with the above description.

The present invention may be embodied in other specific forms without departing from its spirit or essential characteristics. The described embodiments are to be considered in all respects only as illustrative and not restrictive.

We claim:

1. A method of operating a communication system including at least one receiver comprising:
   providing a plurality of pilot symbols;
   receiving pilot data;
   determining an initial time vector as a function of the received pilot data and pilot symbols;
   determining an initial direction vector as a function of the initial time vector and the pilot symbols; and
   determining a first channel estimate as a function of the initial direction vector, the initial time vector, and an initial step size.

2. The method of claim 1 wherein the initial time vector is computed using Discrete Fourier Transform (DFT) processing.

3. The method of claim 2 wherein the Discrete Fourier Transform (DFT) comprises a Fast Fourier Transform (FFT).

4. The method of claim 1 further comprising determining a second channel estimate as a function of a second direction vector, the first channel estimate and a second step size.

5. The method of claim 1 further comprising determining an initial gradient vector from the initial direction vector, wherein the first channel estimate is determined as a function of the initial gradient vector.

6. A method of operating a communication system including at least one receiver comprising:

provide a plurality of symbol estimates;

receiving a plurality of data symbols;

determining an initial time vector as a function of the received data symbols and symbol estimates;

determining an initial direction vector as a function of the initial time vector, the symbol estimates, and an initial channel estimate; and determining a first channel estimate as a function of the initial direction vector, the initial channel estimate and an initial step size.

7. The method of claim 6 wherein the initial time vector is computed using Discrete Fourier Transform (DFT) processing.

8. The method of claim 6 wherein the Discrete Fourier Transform (DFT) comprises a Fast Fourier Transform (FFT).

9. The method of claim 6 further comprising determining a second channel estimate as a function of a second direction vector, the first channel estimate and a second step size.

10. The method of claim 6 wherein the initial channel estimate is equal to a channel estimate from a previous time.

11. The method of determining channel estimation for a pilot block between a transmitting device and a receiving device comprising:

a) initializing a channel estimation device by storing pilot symbols;

b) receiving pilot data;

c) computing an initial time vector as a function of a received pilot data block and pilot symbols;

d) initializing an iteration number t to zero;

e) initializing a channel estimate to equal the initial time vector;

f) computing a direction vector based on the initial time vector, pilot symbols, and channel estimate at iteration t;

g) computing a channel estimate at iteration t+1 based on the direction vector at iteration t, a channel estimate at iteration t, and a step size at iteration t;

h) incrementing iteration number by 1; and i) if t is not equal to a preset number, then repeat steps f) through i); and j) if a magnitude squared of the direction vector is not less than a predetermined value, repeat steps f) through j).

12. The method of determining channel estimation for a data block between a transmitting device and a receiving device comprising:

a) initializing a channel estimation device by determining and storing symbol estimates;

b) receiving data symbols;

c) computing an initial time vector as a function of a received data symbols and symbol estimates;

d) initializing an iteration number t to zero;

e) initializing a channel estimate to equal a channel estimate from a previous time;

f) computing a direction vector based on a initial time vector, pilot symbols, and channel estimate at iteration t;

g) computing a channel estimate at iteration t+1 based on the direction vector at iteration t, a channel estimate at iteration t, and a step size at iteration t;

h) incrementing iteration number by 1;

i) if t is not equal to a preset number, then repeat steps f) through i); and j) if a magnitude squared of the direction vector is not less than a predetermined value, repeat steps f) through j).

13. A receiver for a communication system comprising:

means for receiving a plurality of pilot symbols;

means for receiving pilot data;

means for determining an initial time vector as a function of the received pilot data and pilot symbols;

means for determining an initial direction vector as a function of the initial time vector and the pilot symbols; and means for determining a first channel estimate as a function of the initial direction vector, the initial time vector, and an initial step size.

14. The receiver of claim 13 wherein the initial time vector is computed using Discrete Fourier Transform (DFT) processing.

15. The receiver of claim 13 wherein the Discrete Fourier Transform (DFT) comprises a Fast Fourier Transform (FFT).

16. The receiver of claim 13 further comprising means for determining a second channel estimate as a function of a second direction vector, the first channel estimate and a second step size.

17. A receiver for a communication system comprising:

means for receiving a plurality of symbol estimates;

means for receiving a plurality of data symbols;

means for determining an initial time vector as a function of the received data symbols and symbol estimates;

means for determining an initial direction vector as a function of the initial time vector, the symbol estimates, and an initial channel estimate; and means for determining a first channel estimate as a function of the initial direction vector, the initial channel estimate and an initial step size.

18. The receiver of claim 17 wherein the initial time vector is computed using Discrete Fourier Transform (DFT) processing.

19. The receiver of claim 17 wherein the Discrete Fourier Transform (DFT) comprises a Fast Fourier Transform (FFT).

20. The receiver of claim 17 further comprising means for determining a second channel estimate as a function of a second direction vector, the first channel estimate and a second step size.

21. The receiver of claim 17 wherein the initial channel estimate is equal to a channel estimate from a previous time.

* * * * *